UNITED STATES PATENT OFFICE.

ARMAND MÜLLER-JACOBS, OF NEW YORK, N. Y., ASSIGNOR TO SIMON SULTAN AND WILLIAM F. WEISS, OF SAME PLACE.

PROCESS OF MAKING ARTIFICIAL MUSK.

SPECIFICATION forming part of Letters Patent No. 559,783, dated May 5, 1896.

Application filed November 20, 1894. Serial No. 529,394. (No specimens.)

*To all whom it may concern:*

Be it known that I, ARMAND MÜLLER-JACOBS, a citizen of the Swiss Republic, and a resident of New York, State of New York, have invented certain new and useful Improvements in Methods of Preparing Artificial Musk, of which the following is a specification.

This invention relates to the manufacture of artificial musk; and its novel features consist in the specific method of treating hydrocarbons of the aliphatic series with sulfuric and nitric acid and in the method of purifying the product. It is well known that long ago substances or mixtures of substances of musk-like odor have been obtained by the action of sulfuric and nitric acid on naphtha, kerosene, or certain hydrocarbons contained in the crude petroleum. Warren de la Rue, in 1856, and Bussenius and Eisenstamm, in 1860, described a process by which they obtained compounds or solutions of musk-like odor from kerosene; but for several obvious reasons their processes never could be used in practice. By the action of sulfuric acid upon kerosene or certain hydrocarbons contained therein sulfo-acids of unknown composition are formed which are soluble in water. By the action of nitric acid upon these products they are transformed into crystallized nitro products, bearing, after Bussenius and Eisenstamm, the formulas $C_8H_7(NO_2)_2$ and $C_8H_7(NO_2)_3$ and described as di and tri nitropetroles. Simultaneously with these compounds an oily substance of a very intense musk-like odor is formed, which seems likewise to be a nitro product and which, by the aid of ammonium sulfid, is reduced to an amido compound; but even this product has no value as perfume, as its odor is disagreeable, and, so far as I am aware, no method of its purification has been found up to the present time.

My method consists in the saturation of ice-cold sulfuric acid with the soluble parts of kerosene or naphtha containing the hydrocarbons octane, nonane, and decane and treating the saturated sulfuric acid with one-fourth of its volume of nitric acid of a specific gravity of 20° Baumé. The nitric acid is stirred in slowly.

To obtain a complete saturation of the ice-cold sulfuric acid with the soluble parts of the kerosene or naphtha, I proceed as follows: I take, for instance, one pound of sulfuric acid and shake it thoroughly in a separatory funnel with its volume of naphtha, and by means of their difference in specific gravity the two fluids will separate quickly. I then draw off the sulfuric acid, which I use again to become saturated with another quantity of naphtha, and repeat this process until the sulfuric acid turns intensely dark and will not become further saturated with the soluble naphthene-carbonic acids contained in the naphtha, which acids form the base from which I prepare the artificial musk. The saturated solution thus obtained is then nitrated in the manner above described. The nitrated product is slowly heated up to from 150° to 180° Fahrenheit and poured into at least ten times its volume of ice-cold water. The mixture is then neutralized with ammonia or any other alkali and mixed with a neutral soap prepared from rosin, the quantity of rosin being approximately equal to the quantity of sulfuric acid originally used. The solution is then precipitated with a solution of a metallic salt—for instance, sulfate of aluminium, magnesium, calcium, strontium, or the like—and the precipitate filtered and carefully washed with water. It contains all the musk-smelling substances in a very pure state. If, for instance, alumina is used for precipitating, the precipitate can be washed with alcohol, and the alcoholic solution contains the purified musk. If magnesia is used, the precipitate forms a white powder with a very strong musk-like odor, which for many purposes may be used directly.

Instead of rosin I may use oleic or stearic acid as soap solution; but for many reasons I prefer to use rosin or abietic acid.

Having now described my invention, what I claim as new, and desire to secure by Letters Patent, is—

1. The method of preparing artificial musk which consists: first, in treating kerosene or naphtha with sulfuric and nitric acid, second, neutralizing the product of reaction with an alkali and third, precipitating the odoriferous substance with a metallic soap, substantially as and for the purposes hereinbefore described and set forth.

2. The method of preparing artificial musk which consists: first, in saturating sulfuric acid with the soluble parts of kerosene or naphtha at a low temperature, second, nitrating this saturated solution, third, gradually heating the nitrated product to a suitable temperature, fourth, neutralizing the nitrated product with an alkali, fifth, precipitating the neutralized product by means of a metallic soap, substantially as and for the purposes hereinbefore described and set forth.

In testimony that I claim the foregoing as my invention I have signed my name, in presence of two witnesses, this 13th day of November, 1894.

ARMAND MÜLLER-JACOBS.

Witnesses:
  HERMAN F. LEE,
  JOHN C. LEBRET.